US010272497B2

(12) United States Patent
Zheng et al.

(10) Patent No.: US 10,272,497 B2
(45) Date of Patent: Apr. 30, 2019

(54) CLADDED ARTICLES AND METHODS OF MAKING THE SAME

(71) Applicant: Kennametal Inc., Latrobe, PA (US)

(72) Inventors: Qingjun Zheng, Export, PA (US);
Yixiong Liu, Greensburg, PA (US);
James A. Faust, New Albany, IN (US);
Danie J. De Wet, Belleville (CA);
Sudharsan Subbaiyan, Belleville (CA);
Piyamanee Komolwit, Greensburg, PA (US); Mark J. Rowe, New Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 242 days.

(21) Appl. No.: 15/073,014

(22) Filed: Mar. 17, 2016

(65) Prior Publication Data
US 2016/0193660 A1    Jul. 7, 2016

Related U.S. Application Data

(62) Division of application No. 13/833,411, filed on Mar. 15, 2013, now Pat. No. 9,346,101.

(51) Int. Cl.
*B22F 3/10*    (2006.01)
*B22F 7/00*    (2006.01)
(Continued)

(52) U.S. Cl.
CPC .............. *B22F 7/04* (2013.01); *B22F 3/10* (2013.01); *B22F 7/008* (2013.01); *B22F 7/062* (2013.01);
(Continued)

(58) Field of Classification Search
CPC .... B22F 7/04; B22F 3/10; B22F 7/062; B22F 7/08; B22F 7/008; C22C 38/38;
(Continued)

(56) References Cited

U.S. PATENT DOCUMENTS 3,556,161 A    1/1971  Roberts
3,743,556 A *  7/1973  Breton et al. ......... C23C 24/103
                                                    156/62.8
(Continued)

FOREIGN PATENT DOCUMENTS

CN    101994114 A    3/2011
CN    102922168 A    2/2013
(Continued)

OTHER PUBLICATIONS

JJ Conway et al., ASM Manual "Hot Isostatic Pressing of Metal Powders".
(Continued)

*Primary Examiner* — Keith Walker
*Assistant Examiner* — John A Hevey
(74) *Attorney, Agent, or Firm* — Larry R. Meenan (57) ABSTRACT

In one aspect, methods of making cladded articles are described herein. A method of making a cladded article, in some embodiments, comprises disposing over a surface of a metallic substrate a sheet comprising organic binder and powder metal or powder alloy having a solidus temperature at least 100° C. less than the metallic substrate and heating the powder metal or powder alloy to provide a sintered metal or sintered alloy cladding metallurgically bonded to the metallic substrate.

16 Claims, 4 Drawing Sheets

(51) Int. Cl.

| | | |
|---|---|---|
| B22F 7/04 | (2006.01) | |
| B22F 7/06 | (2006.01) | |
| B22F 7/08 | (2006.01) | |
| C22C 1/04 | (2006.01) | |
| B32B 15/01 | (2006.01) | |
| C22C 19/00 | (2006.01) | |
| C22C 19/03 | (2006.01) | |
| C22C 19/05 | (2006.01) | |
| C22C 38/04 | (2006.01) | |
| C22C 38/22 | (2006.01) | |
| C22C 38/36 | (2006.01) | |
| C22C 38/38 | (2006.01) | |

(52) U.S. Cl.
CPC .............. *B22F 7/08* (2013.01); *B32B 15/011* (2013.01); *B32B 15/015* (2013.01); *C22C 1/0433* (2013.01); *C22C 19/002* (2013.01); *C22C 19/005* (2013.01); *C22C 19/03* (2013.01); *C22C 19/055* (2013.01); *C22C 19/056* (2013.01); *C22C 19/057* (2013.01); *C22C 19/058* (2013.01); *C22C 38/04* (2013.01); *C22C 38/22* (2013.01); *C22C 38/36* (2013.01); *C22C 38/38* (2013.01)

(58) Field of Classification Search
CPC ......... C22C 38/36; C22C 38/22; C22C 38/04; C22C 19/057; C22C 19/058; C22C 19/056; C22C 19/002; C22C 19/005; C22C 19/03; C22C 19/055; C22C 1/0433; B32B 15/015; B32B 15/011
See application file for complete search history.

(56) References Cited

U.S. PATENT DOCUMENTS

| | | | |
|---|---|---|---|
| 3,778,586 A * | 12/1973 | Breton | B23K 20/227 |
| | | | 219/149 |
| 3,876,447 A | 4/1975 | Lally | |
| 4,073,639 A | 2/1978 | Duvall | |
| 4,381,944 A | 5/1983 | Smith, Jr. | |
| 4,493,451 A | 1/1985 | Clark | |
| 4,596,691 A * | 6/1986 | Ruppert | B23K 35/0238 |
| | | | 228/254 |
| 4,596,746 A | 6/1986 | Morishita | |
| 4,614,296 A | 9/1986 | Lesgourgues | |
| 4,692,305 A | 9/1987 | Rangaswamy | |
| 4,830,934 A | 5/1989 | Ferrigno | |
| 4,910,098 A | 3/1990 | Lee | |
| 4,933,008 A | 6/1990 | Fujiki | |
| 4,940,566 A | 7/1990 | Wood | |
| 5,156,321 A | 10/1992 | Liburdi | |
| 5,240,491 A | 8/1993 | Budinger | |
| 5,348,215 A | 9/1994 | Rafferty | |
| 5,522,134 A | 6/1996 | Rowe | |
| 5,523,169 A | 6/1996 | Rafferty | |
| 5,523,170 A | 6/1996 | Budinger | |
| 5,593,726 A * | 1/1997 | Nicholls | C23C 24/082 |
| | | | 427/189 |
| 5,890,274 A | 4/1999 | Clement | |
| 5,952,042 A | 9/1999 | Rafferty | |
| 6,749,104 B2 * | 6/2004 | Rabinkin | B23K 1/0012 |
| | | | 228/183 |
| 7,017,793 B2 | 3/2006 | Kinstler | |
| 7,051,435 B1 | 5/2006 | Subramanian | |
| 7,115,679 B2 | 10/2006 | Ellison | |
| 7,326,892 B1 | 2/2008 | Cretegny | |
| 7,335,427 B2 | 2/2008 | Sathian | |
| 7,789,288 B1 | 9/2010 | Johnson | |
| 8,034,154 B2 | 10/2011 | Singer | |
| 8,087,565 B2 | 1/2012 | Kottilingam | |
| 8,273,148 B2 | 9/2012 | Minor | |
| 8,393,528 B2 | 3/2013 | Richter | |
| 8,703,044 B2 | 4/2014 | Sathian | |
| 9,321,107 B2 | 4/2016 | Daniels | |
| 9,434,017 B2 | 9/2016 | Salm | |
| 2004/0191064 A1 | 9/2004 | Guo | |
| 2006/0134454 A1 | 6/2006 | Sathian | |
| 2009/0123268 A1 | 5/2009 | Brittingham | |
| 2009/0139607 A1 | 6/2009 | Kool | |
| 2010/0261419 A1 | 10/2010 | Sung | |
| 2013/0255843 A1 | 10/2013 | Kiuchi | |
| 2014/0057124 A1 | 2/2014 | Komolwit | |
| 2014/0212681 A1 | 7/2014 | Cui | |

FOREIGN PATENT DOCUMENTS

| | | |
|---|---|---|
| DE | 10016830 A1 | 7/2001 |
| EP | 0152263 B1 | 7/1989 |
| EP | 0673292 | 8/2002 |
| EP | 1881154 | 2/2009 |
| JP | 6077962 | 5/1985 |
| JP | 3070658 | 7/2000 |
| KR | 20060050963 A | 5/2006 |
| WO | WO1994011139 A1 | 5/1994 |

OTHER PUBLICATIONS

Sulzer, Material Product Data Sheet.
K.J. Pallos, Gas Turbine Repair Technology.
Xiao Huang et al., Wide Gap Braze Repair of Gas Tubrine Blades and Vanes.
German, Randall M., Powder Metallurgy and Particulate Materials Processing.
May 20, 2016 Final Office Action.
Nov. 20, 2017 Office action (3 months) 1.
Sandmeyer Steel Company, Food Processing.
Special Metals, Incoloy alloy 825.
Nov. 7, 2016 Search report.
Nov. 24, 2016 EPO Notification R70a(2)&R70(2).
Feb. 13, 2017 Final Office Action.
Aug. 12, 2016 Office action (3 months) 1.
Sep. 14, 2016 EPO Notification R64/164.
Jul. 11, 2018 International Search Report Transmitted.
Mar. 15, 2018 First office action.
Apr. 4, 2018 Final Office Action.

\* cited by examiner

CLADDED ARTICLES AND METHODS OF MAKING THE SAME

RELATED APPLICATION DATA

Pursuant to 35 U.S.C. § 121, the present application is a divisional application of U.S. patent application Ser. No. 13/833,411 filed Mar. 15, 2013.

FIELD

The present invention relates to claddings for metal and alloy articles and, in particular, to methods of cladding metal and alloy articles.

BACKGROUND

Claddings are often applied to articles or components subjected to harsh environments or operating conditions in efforts to extend the useful lifetime of the articles or components. Metal or alloy claddings can be applied to metallic substrates by a variety of techniques including weld overlay, plasma transferred arc, thermal spray, laser cladding, infrared cladding or induction cladding. Several of these cladding techniques, however, are unsuitable for metallic substrates of complex geometry, require substantial cladding deposition times and/or require operating temperatures detrimental to substrate integrity.

SUMMARY

Briefly, in one aspect, methods of making cladded articles are described herein which, in some embodiments, can offer one or more advantages over prior cladding techniques, including the flexibility for achieving full cladding densification and metallurgical bonding to substrates of complex geometry and varying cladding thickness. A method of making a cladded article described herein, in some embodiments, comprises disposing over a surface of a metallic substrate a sheet comprising organic binder and powder metal or powder alloy having a solidus temperature at least 100° C. less than the metallic substrate and heating the powder metal or powder alloy to provide a sintered metal or sintered alloy cladding metallurgically bonded to the metallic substrate. The sintered metal or sintered alloy cladding, in some embodiments, is substantially fully dense. Moreover, in some embodiments, the sheet further comprises hard particles providing sintered metal matrix or sintered alloy matrix composite cladding.

In another aspect, a method of making a cladded article described herein comprises disposing over a surface of a metallic substrate a sheet comprising organic binder and a mixture of base alloy powder and alloying additive powder, the alloying additive powder having a lower solidus temperature than the base alloy powder, and heating the mixture of base alloy powder and alloying additive powder to a temperature 100° C. to 400° C. below the solidus temperature of the metallic substrate to provide a substantially fully dense sintered alloy cladding metallurgically bonded to the metallic substrate. Additionally, the sheet can further comprise hard particles providing sintered alloy matrix composite cladding.

In another aspect, cladded articles are provided. A cladded article described herein, in some embodiments, comprises a metallic substrate and a sintered powder metal or sintered powder alloy cladding adhered to the substrate, wherein the powder metal or powder alloy has a solidus temperature at least 100° C. less than the metallic substrate. The sintered powder metal or sintered powder alloy cladding can be substantially fully dense. Further, the sintered powder metal or sintered powder alloy cladding can also comprise hard particles providing metal matrix or alloy matrix composite cladding.

These and other embodiments are described in greater detail in the detailed description which follows.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Methods of Making Cladded Articles

A. A method of making a cladded article described herein, in some embodiments, comprises disposing over a surface of a metallic substrate a sheet comprising organic binder and powder metal or powder alloy having a solidus temperature at least 100° C. less than the metallic substrate and heating the powder metal or powder alloy to provide a sintered metal or sintered alloy cladding metallurgically bonded to the metallic substrate. The sintered metal or sintered alloy cladding, in some embodiments, is substantially fully dense. Moreover, in some embodiments, the sheet further comprises hard particles providing sintered metal matrix or sintered alloy matrix composite cladding.

Turning now to specific steps, a method described herein comprises disposing over a surface of a metallic substrate a sheet comprising organic binder and powder metal or powder alloy. Suitable metallic substrates include, but are not limited to, steels, iron-based alloys, nickel-based alloys and cobalt-based alloys. Steels, in some embodiments, comprise carbon steels, alloy steels, tool steels or stainless steels. In one embodiment, for example, a steel substrate has carbon content greater than 0.3 weight percent. Further, nickel-based alloy substrates, in some embodiments, are commercially available under the INCONEL®, HASTELLOY® and/or BALCO® trade designations, and cobalt-based alloy substrates are commercially available under the STELLITE®, HAYNES®, and/or TRIBALOY® trade designations.

Metallic substrates can display various geometries. In some embodiments, a substrate has a cylindrical geometry, wherein the inner diameter (ID) surface, outer diameter (OD) surface or both can be cladded according to methods described herein. In some embodiments, for example, metallic substrates comprise wear pads, pelletizing dies, bearings, extruder barrels, extruder screws, flow control components, piping or tubes. Substrates cladded according to methods described herein, in some embodiments, are used in oil well and/or gas drilling, petrochemical, power generation, food and pet food industries as well as general engineering applications involving wear, abrasion, corrosion and/or high temperature.

As described herein, a sheet comprising organic binder and powder metal or powder alloy is disposed over one or more surfaces of the metallic substrate. The sheet can be cloth-like in nature. In some embodiments, organic binder of the sheet comprises one or more polymeric materials. Suitable polymeric materials for use in the sheet can include one or more fluoropolymers including, but not limited to, polytetrafluoroethylene (PTFE).

Powder metal or powder alloy of the sheet has a solidus temperature at least 100° C. below the solidus temperature of the metallic substrate. In some embodiments, the powder metal or powder alloy has a solidus temperature at least 150° C. below or at least 175° C. below the solidus temperature of the metallic substrate. Further, the powder metal or powder alloy can have a solidus temperature at least 200° C. below or at least 250° C. below the solidus temperature of the metallic substrate. In some embodiments, the powder metal or powder alloy has a solidus temperature of 100° C. to 300° C. below or 200° C. to 300° C. below the solidus temperature of the metallic substrate.

Powder alloy of the sheet can be selected to produce claddings of sintered nickel-based alloys, sintered cobalt-based alloys or sintered iron-based alloys. Sintered nickel-based alloy cladding derived from powder alloy carried in the sheet can have compositional parameters derived from Table I.

TABLE I

Nickel-based alloys

| Element | Amount (wt. %) |
|---|---|
| Chromium | 0-30 |
| Molybdenum | 0-28 |
| Tungsten | 0-15 |
| Niobium | 0-6 |
| Tantalum | 0-6 |
| Titanium | 0-6 |
| Iron | 0-30 |
| Cobalt | 0-15 |
| Copper | 0-50 |

TABLE I-continued

Nickel-based alloys

| Element | Amount (wt. %) |
|---|---|
| Carbon | 0-2 |
| Manganese | 0-2 |
| Silicon | 0-10 |
| Phosphorus | 0-10 |
| Sulfur | 0-0.1 |
| Aluminum | 0-1 |
| Boron | 0-5 |
| Nickel | Balance |

In some embodiments, for example, sintered nickel-based alloy cladding comprises 18-23 wt. % chromium, 5-11 wt. % molybdenum, 2-5 wt. % total of niobium and tantalum, 0-5 wt. % iron, 0.1-5 wt. % boron and the balance nickel. Alternatively, sintered nickel-based alloy cladding comprises 12-20 wt. % chromium, 5-11 wt. % iron, 0.5-2 wt. % manganese, 0-2 wt. % silicon, 0-1 wt. % copper, 0-2 wt. % carbon, 0.1-5 wt. % boron and the balance nickel. Further, sintered nickel-based alloy cladding can comprise 3-27 wt. % chromium, 0-10 wt. % silicon, 0-10 wt. % phosphorus, 0-10 wt, % iron, 0-2 wt. % carbon, 0-5 wt. % boron and the balance nickel.

Moreover, sintered cobalt-based alloy cladding derived from powder alloy carried in the sheet can have compositional parameters derived from Table II.

TABLE II

Cobalt-based alloys

| Element | Amount (wt. %) |
|---|---|
| Chromium | 5-35 |
| Tungsten | 0-35 |
| Molybdenum | 0-35 |
| Nickel | 0-20 |
| Iron | 0-25 |
| Manganese | 0-2 |
| Silicon | 0-5 |
| Vanadium | 0-5 |
| Carbon | 0-4 |
| Boron | 0-5 |
| Cobalt | Balance |

In some embodiments, sintered cobalt-based alloy cladding derived from powder alloy of the sheet is selected from Table III.

TABLE III

Sintered Co-Based Alloy Cladding

| Co-Based Alloy Cladding | Compositional Parameters (wt. %) |
|---|---|
| 1 | Co—(15-35)%Cr—(0-35)%W—(0-20)%Mo—(0-20)%Ni—(0-25)%Fe—(0-2)%Mn—(0-5)%Si—(0-5)%V—(0-4)%C—(0-5)%B |
| 2 | Co—(20-35)%Cr—(0-10)%W—(0-10)%Mo—(0-2)%Ni—(0-2)%Fe—(0-2)%Mn—(0-5)%Si—(0-2)%V—(0-0.4)%C—(0-5)%B |
| 3 | Co—(5-20)%Cr—(0-2)%W—(10-35)%Mo—(0-20)%Ni—(0-5)%Fe—(0-2)%Mn—(0-5)%Si—(0-5)%V—(0-0.3)%C—(0-5)%B |
| 4 | Co—(15-35)%Cr—(0-35)%W—(0-20)%Mo—(0-20)%Ni—(0-25)%Fe—(0-1.5)%Mn—(0-2)%Si—(0-5)%V—(0-3.5)%C—(0-1)%B |
| 5 | Co—(20-35)%Cr—(0-10)%W—(0-10)%Mo—(0-1.5)%Ni—(0-1.5)%Fe—(0-1.5)%Mn—(0-1.5)%Si—(0-1)%V—(0-0.35)%C—(0-0.5)%B |
| 6 | Co—(5-20)%Cr—(0-1)%W—(10-35)%Mo—(0-20)%Ni—(0-5)%Fe—(0-1)%Mn—(0.5-5)%Si—(0-1)%V—(0-0.2)%C—(0-1)%B |

Sintered iron-based alloy claddings derived from powder alloy carried in the sheet can comprise 0.2-6 wt. % carbon, 0-30 wt. % chromium, 0-37 wt. % manganese, 0-16 wt % molybdenum, other alloying elements and the balance iron. In some embodiments, sintered iron-based alloy cladding has a composition according to Table IV.

TABLE IV

Sintered Iron-based Alloy Cladding Compositional Parameters

| Fe-Based Alloy | Compositional Parameters (wt. %) |
| --- | --- |
| 1 | Fe—(2-6)%C |
| 2 | Fe—(2-6)%C—(0-5)%Cr—(29-37)%Mn |
| 3 | Fe—(2-6)%C—(0.1-5)%Cr |
| 4 | Fe—(2-6)%C—(0-37)%Mn—(8-16)%Mo |

Powder alloy carried by the sheet can be provided in pre-alloyed form having parameters for producing sintered nickel-based alloy cladding, sintered cobalt-based alloy cladding or sintered iron-based alloy cladding of desired composition. In some embodiments, pre-alloyed powders can be used to produce any of the sintered nickel-based, cobalt-based or iron-based alloy claddings described hereinabove. In one embodiment, for example, the sheet comprises pre-alloyed nickel-based alloy powder comprising 3-30 wt. % chromium, 0-20 wt. % molybdenum, 0-15 wt. % tungsten, 0-6 wt. % niobium, 0-6 wt. % tantalum, 0-6 wt. % titanium, 0-20 wt. % iron, 0-15 wt. % cobalt, 0-5 wt. % boron, 0-2 wt. % carbon, 0-2 wt. % manganese, 0-10 wt. % silicon, 0-10 wt. % phosphorus, 0-0.1 wt. % sulfur, 0-1 wt. % aluminum, 0-2 wt. % titanium, 0-2 wt. % cobalt, 0-50 wt. % copper and the balance nickel. In some embodiments, the sheet comprises pre-alloyed cobalt-based alloy powder having a composition selected from Tables II and/or III herein. Further, the sheet can comprise pre-alloyed iron-based alloy powder having a composition selected from Table IV.

Pre-alloyed powder carried by the sheet, in some embodiments, further comprises one or more elements of boron, silicon, phosphorus, aluminum or carbon as an alloying additive in an amount sufficient to reduce the solidus temperature of the alloy. In some embodiments, elements of alloying additive are present in pre-alloyed nickel-based or cobalt-based alloy powder according to Table V.

TABLE V

Alloying Additive Content

| Cladding Alloy | Boron (wt. %) | Phosphorus (wt. %) | Carbon (wt. %) | Silicon (wt. %) | Aluminum (wt. %) |
| --- | --- | --- | --- | --- | --- |
| Ni-based alloy | 0-5 | 0-15 | 0-2 | 0-15 | 0-1 |
| Co-based alloy | 0-5 | 0-15 | 0-4 | 0-15 | — |

Powder metal or powder alloy of the sheet can have any particle size not inconsistent with the objectives of the present invention. In some embodiments, powder metal or powder alloy has an average particle size of 10 μm to 200 μm. For example, in one embodiment, powder metal or powder alloy has an average particle size of 10-44 μm. Further, powder metal or powder alloy can demonstrate bi-modal or multi-modal size distributions.

Powder metal or powder alloy of the desired composition is combined with the organic binder to fabricate the sheet carrying the powder metal or alloy. The organic binder and the powder metal or powder alloy are mechanically worked or processed to trap the metal or alloy powder in the organic binder. In one embodiment, for example, the powder metal or powder alloy is mixed with 3-15 vol. % PTFE and mechanically worked to fibrillate the PTFE and trap the powder metal or powder alloy. Mechanical working can include rolling, ball milling, stretching, elongating, spreading or combinations thereof. In some embodiments, the sheet comprising the powder metal or powder alloy is subjected to cold isostatic pressing. The resulting sheet can have a low elastic modulus and high green strength. In some embodiments, a sheet comprising organic binder and powder metal or powder alloy is produced in accordance with the disclosure of one or more of U.S. Pat. Nos. 3,743,556, 3,864,124, 3,916,506, 4,194,040 and 5,352,526, each of which is incorporated herein by reference in its entirety.

The sheet comprising organic binder and powder metal or powder alloy is positioned over one or more surfaces of the metallic substrate and heated to provide a sintered metal or sintered alloy cladding metallurgically bonded to the substrate. Organic binder of the sheet is decomposed or burned off during the heating process. The metallic substrate and powder metal or powder alloy can be heated in vacuum or under inert or reducing atmosphere to a temperature and for a time period sufficient to provide the sintered metal or sintered alloy cladding metallurgically bonded to the substrate. As described herein, the sintered metal or sintered alloy cladding can be substantially fully dense. Sintering temperatures and times are dependent on the specific identity of the powder metal or powder alloy and substrate. For powder alloys described herein, sintering temperatures can generally range from 950° C. to 1300° C. with sintering times of 20 minutes to 2 hours to achieve full or substantially full cladding densification. As described further herein, lower solidus temperatures of the powder metal or powder alloy can facilitate use of sintering temperatures 100° C. to 400° C. below the solidus temperature of the metallic substrate to provide a substantially fully dense sintered metal or alloy cladding.

Further, in some embodiments, an interfacial diffusion region is established between the sintered metal or sintered alloy cladding and the metallic substrate. An interfacial diffusion region, in some embodiments, has a thickness of 10 μm to 200 μm. In some embodiments, an interfacial diffusion region has a thickness of 50 μm to 200 μm.

Claddings applied to metal substrates by methods described herein can have any desired thickness. In some embodiments, a cladding applied to a metallic substrate has a thickness according to Table VI.

TABLE VI

| Cladding Thickness |
| --- |
| Cladding Thickness |
| >50 μm |
| >100 μm |
| 100 μm-20 mm |
| 500 μm-5 mm |

Additionally, the sheet carrying the powder metal or powder alloy can further comprise hard particles for providing sintered metal matrix or sintered alloy matrix composite cladding. In such embodiments, hard particles become trapped in the metal or alloy matrix formed during sintering of the powder metal or powder alloy producing sintered metal or sintered alloy matrix composite cladding. Suitable hard particles can comprise particles of metal carbides, metal nitrides, metal carbonitrides, metal borides, metal silicides, cemented carbides, cast carbides, intermetallic compounds or other ceramics or mixtures thereof. In some embodiments, metallic elements of hard particles comprise aluminum, boron, silicon and/or one or more metallic elements selected from Groups IVB, VB, and VIB of the Periodic Table. Groups of the Periodic Table described herein are identified according to the CAS designation.

In some embodiments, for example, hard particles comprise carbides of tungsten, titanium, chromium, molybdenum, zirconium, hafnium, tanatalum, niobium, rhenium, vanadium, boron or silicon or mixtures thereof. Hard particles, in some embodiments, comprise nitrides of aluminum, boron, silicon, titanium, zirconium, hafnium, tantalum or niobium, including cubic boron nitride, or mixtures thereof. Additionally, in some embodiments, hard particles comprise borides such as titanium di-boride, $B_4C$ or tantalum borides or silicides such as $MoSi_2$ or $Al_2O_3$—SiN. Hard particles can comprise crushed cemented carbide, crushed carbide, crushed nitride, crushed boride, crushed silicide, or other ceramic particle reinforced metal matrix composites or combinations thereof. Crushed cemented carbide particles, for example, can have 2 to 25 weight percent metallic binder. Additionally, hard particles can comprise intermetallic compounds such as nickel aluminide.

Hard particles can have any size not inconsistent with the objectives of the present invention. In some embodiments, hard particles have a size distribution ranging from about 0.1 μm to about 1 mm. Hard particles can also demonstrate bimodal or multi-modal size distributions.

Hard particles can have any desired shape or geometry. In some embodiments, hard particles have spherical, elliptical or polygonal geometry. Hard particles, in some embodiments, have irregular shapes, including shapes with sharp edges.

Hard particles can be present in sintered metal or sintered alloy claddings described herein in any amount not inconsistent with the objectives of the present invention. Hard particle loading of a cladding can vary according to several considerations including, but not limited to, the desired hardness, abrasion resistance and/or toughness of the cladding. In some embodiments, hard particles are present in a cladding in an amount of 0.5 weight percent to 40 weight percent. Hard particles, in some embodiments, are present in a cladding in an amount of 1 weight percent to 20 weight percent or 5 weight percent to 20 weight percent.

B. In another aspect, a method of making a cladded article comprises disposing over a surface of a metallic substrate a sheet comprising organic binder and a mixture of base alloy powder and alloying additive powder, the alloying additive powder having a lower solidus temperature than the base alloy powder, and heating the mixture of base alloy powder and alloying additive powder to a temperature 100° C. to 400° C. below the solidus temperature of the metallic substrate to provide a substantially fully dense sintered alloy cladding metallurgically bonded to the substrate.

Turning now to specific steps, the present method comprises disposing over a surface of a metallic substrate a sheet comprising organic binder and a mixture of base alloy powder and alloying additive powder. Suitable metallic substrates can comprise any metallic substrate described in Section IA above. In some embodiments, for example, metallic substrates include steels, iron-based alloys, nickel-based alloys or cobalt-based alloys. Further, metallic substrates can demonstrate any geometry or be suited for any application disclosed herein including petrochemical applications, power generation applications, food and pet food industrial applications as well as general engineering applications involving wear, abrasion, corrosion and/or high temperature.

Similarly, the sheet carrying the mixture of base alloy powder and additive alloy powder can be cloth-like in nature and have any construction described in Section IA above. For example, organic binder of the sheet can comprise one or more polymeric materials including fluoropolymers, such as PTFE.

Base alloy powder of the mixture can comprise any nickel-based, cobalt-based or iron-based alloy described in Section IA herein. In some embodiments, base alloy powder is nickel-based alloy having a composition derived from Table I herein. Base alloy powder, for example, can be nickel-based alloy comprising 3-30 wt. % chromium, 0-15 wt. % molybdenum, 0-6 wt. % niobium, 0-6 wt. % tantalum, 0-30 wt. % iron, 0-5 wt. % boron, 0-2 wt. % carbon, 0-2 wt. % manganese, 0-10 wt. % silicon, 0-5 wt. % phosphorus, 0-0.1 wt. % sulfur, 0-1 wt. % aluminum, 0-2 wt. % titanium, 0-2 wt. % cobalt, 0-50 wt. % copper and the balance nickel.

Base alloy powder, in some embodiments, is cobalt-based alloy. Suitable cobalt-based alloys can have compositional parameters selected from Tables II and/or III herein. Further, base alloy powder, in some embodiments, is iron-based alloy having a composition selected from Table IV herein.

Base alloy powder can be present in the mixture with alloying additive powder in an amount over 60 wt. %. In some embodiments, base alloy powder is present in the mixture in an amount of 80 wt. % to 95 wt. % or 95 wt. % to 99.5 wt. %

Moreover, alloying additive powder of the mixture can comprise boron, silicon, carbon, phosphorus, aluminum, chromium or combinations thereof. In some embodiments, boron, silicon, carbon, phosphorus, aluminum and/or chromium are provided as elemental powder(s) to generate an alloying additive powder. Alternatively, boron, silicon, carbon, phosphorus, aluminum and/or chromium can be incorporated into a master alloy or brazing alloy composition serving as the alloying additive powder. For example, master alloy powder suitable for mixing with nickel-based base alloy powder can have compositional parameters selected from Table VII.

TABLE VII

Master Alloy Compositions

| Element | Amount (wt. %) |
|---|---|
| Boron | 0-7 |
| Chromium | 0-30 |
| Silicon | 0-15 |
| Phosphorus | 0-15 |
| Iron | ≤10 |
| Nickel | Balance |

In one embodiment, master alloy powder comprising 1-4 wt. % boron, 5-15 wt. % chromium, 3-6 wt. % iron and the balance nickel can serve as an alloying additive powder in a mixture with nickel-based base alloy powder. Additional master alloys suitable for mixing with nickel-based base alloy powder are commercially available under NICROBRAZ® trade designation, including NICROBRAZ® 50, 125, 130, 150, 3002, LC and/or LM.

Alloying additive powder can be present in the mixture with base alloy powder in any amount not inconsistent with the objectives of the present invention. In some embodiments, alloying additive powder is present in the mixture in an amount of 0.5 wt. % to 5 wt. %. In further embodiments, alloying additive powder is present in the mixture in an amount of 6 wt. % to 10 wt. %.

Base alloy powder and/or alloying additive powder can have any desired particle size not inconsistent with the objectives of the present invention. In some embodiments, base alloy powder and alloying additive powder each have an average particle size less than 44 µm. In other embodiments, at least one of the base alloy powder and alloying additive powder has an average particle size of 10-200 µm. Base alloy powder and alloying additive powder can have substantially the same average particle size. Alternatively, base alloy powder and alloying additive powder have different average particles sizes providing a mixture with bi-modal or multi-modal particle size distributions.

The mixture of base alloy powder and alloying additive powder is combined with organic binder to fabricate the sheet carrying the powder mixture. Combination of the powder mixture with the organic binder and subsequent sheet formation can be administered as set forth in Section IA herein.

The mixture of base alloy powder and alloying additive powder is heated to a temperature 100° C. to 400° C. below the solidus temperature of the metallic substrate to provide a substantially fully dense sintered alloy cladding metallurgically bonded to the substrate. The organic binder is decomposed or burned off during the heating process. In some embodiments, the mixture of base alloy powder and alloying additive powder is heated to a temperature 200° C. to 400° C. below the solidus temperature of the metallic substrate to provide a substantially fully dense sintered alloy cladding metallurgically bonded to the substrate. Further, the mixture of base alloy powder and alloying additive powder can be heated to a temperature 250° C. to 400° C. below the solidus temperature of the metallic substrate to provide a substantially fully dense sintered alloy cladding metallurgically bonded to the substrate.

Substrates of steel, nickel-based alloy, iron-based alloy and cobalt-based alloy described herein can demonstrate solidus temperatures in the range of 1300° C. to 1550° C. Therefore, sintering temperatures of the base alloy and the alloying additive powder mixture can generally range from 900° C. to 1450° C. with sintering time of 20 minutes to 2 hours. Further, in some embodiments, an interfacial diffusion region is established between the sintered alloy cladding and the metallic substrate. An interfacial diffusion region, in some embodiments, has a thickness of 10 µm to 200 µm. The interfacial diffusion region, in some embodiments, has a thickness greater than 50 µm.

Claddings applied to metallic substrates according to methods in this Section IB can have any desired thickness. In some embodiments, a cladding applied to a metallic substrate has a thickness according to Table IV herein. Additionally, the sheet carrying the base alloy powder and the alloying additive powder can further comprise hard particles for providing sintered alloy matrix composite cladding. Suitable hard particles and hard particle loadings of the cladding are described in Section IA above.

II. Cladded Articles

In another aspect, cladded articles are provided. A cladded article described herein, in some embodiments, comprises a metallic substrate and a sintered powder metal or sintered powder alloy cladding adhered to the substrate, wherein the powder metal or powder alloy has a solidus temperature at least 100° C. below the solidus temperature of the metallic substrate. The powder metal or powder alloy, in some embodiments, has a solidus temperature at least 150° C. below or at least 200° C. below the solidus temperature of the metallic substrate. In some embodiments, the powder metal or powder alloy has a solidus temperature 100° C. to 400° C. below the solidus temperature of the metallic substrate.

Powder metal or powder alloy sintered to provide a cladding adhered to the metallic substrate can comprise any powder metal or powder alloy composition described in Sections IA-B herein. In some embodiments, powder metal or powder alloy comprises one or more elements of boron, silicon, phosphorus, aluminum or carbon as an alloying additive for reducing the solidus temperature of the metal or alloy. Alloying additive, for example, can be present in nickel-based alloy and cobalt-based alloy powders according to Table V herein.

Claddings adhered to metallic substrates, in some embodiments, are sintered nickel-based alloy having compositional parameters selected from Table I herein. For example, in one embodiment, a cladding is sintered nickel-based alloy comprising 3-30 wt. % chromium, 0-15 wt. % molybdenum, 0-6 wt. % niobium, 0-6 wt. % tantalum, 0-30 wt. % iron, 0-2 wt. % carbon, 0-2 wt. % manganese, 0-10 wt. % silicon, 0-5 wt. % phosphorus, 0-0.1 wt. % sulfur, 0-1 wt. % aluminum, 0-2 wt. % titanium, 0-2 wt. % cobalt, 0-50 wt. % copper, 0-1 wt. % aluminum, 0.1-5 wt. % boron and the balance nickel.

A cladding, in some embodiments, is sintered cobalt-based alloy. Sintered cobalt-based alloy cladding can comprise compositional parameters selected from Tables II and/or III herein. Sintered iron-based alloy claddings, in some embodiments, have compositional parameters selected from Table IV above.

Claddings of articles described herein can have any properties described in Sections IA-B above, including thicknesses selected from Table VI. Additionally, a cladded article can demonstrate an interfacial diffusion region having a thickness of 10-200 µm between the sintered metal or sintered alloy cladding and the metallic substrate. In some embodiments, the interfacial diffusion region has a thickness of 50 µM to 200 µm. Further, as described in Sections IA-B above, a cladding can also comprise hard particles in the sintered metal or sintered alloy providing metal matrix or alloy matrix composite cladding.

These and other embodiments are further illustrated by the following non-limiting examples.

Example 1

Figure 1:
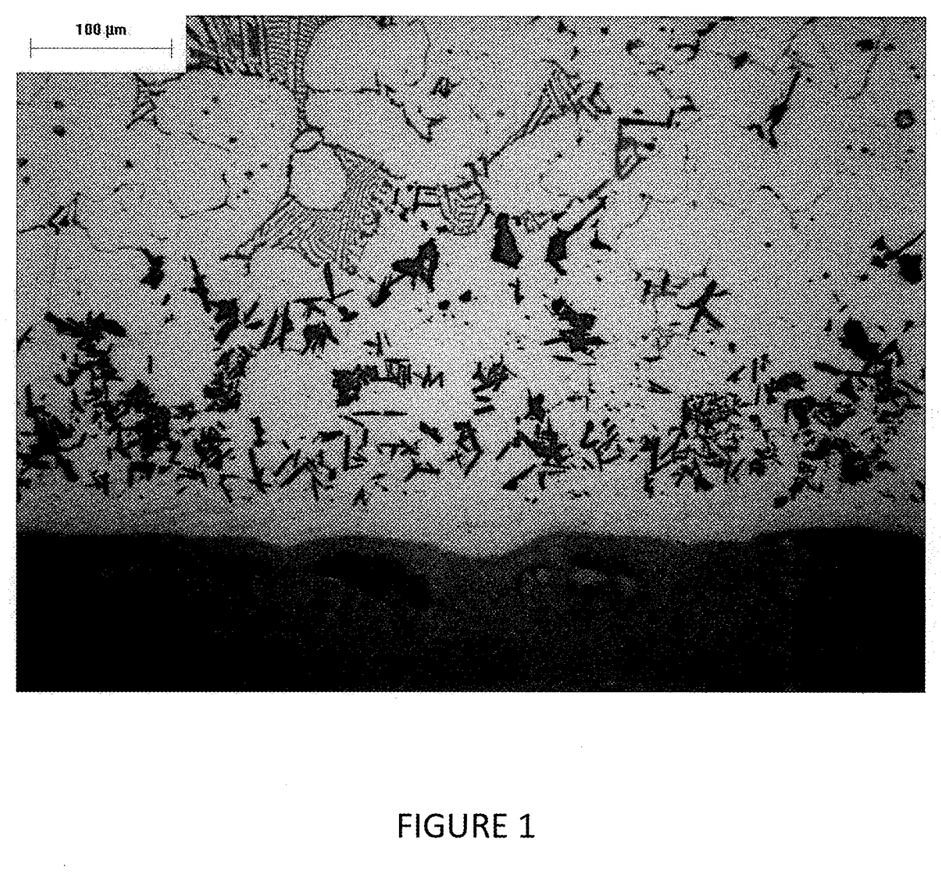
FIG. 1 is a cross-section metallograph of a cladded article according to one embodiment described herein.

A cladded article was produced according to a method described herein as follows. −325 mesh alloy powder with a composition of 20-23% chromium, 8-10% molybdenum, up to 5% iron, 3.15-4.15% total of niobium and tantalum and the balance nickel by weight was mixed and blended with 5-10 wt. % master alloy powder with composition of 79-84% nickel, 13-19% chromium and 2-5% boron by weight, and with 6% by volume of PTFE. The resulting powder mixture was mechanically worked to trap the alloy particles into a cloth-like flexible sheet. The cloth-like flexible sheet was applied to a 4140 steel substrate by adhesive, followed by debindering and heating in a controlled atmosphere furnace to a temperature of 1280-1350° C. and holding for 20 minutes to 2 hours to provide a substantially fully dense sintered cladding metallurgically bonded to the 4140 steel substrate. The sintered nickel-based alloy cladding had a composition of 17-22 wt. % chromium, 6-9 wt. % molybdenum, up to 5 wt. % iron, 2-4.2 wt. % total of niobium and tantalum, 0.01-5 wt. % boron and the balance nickel. FIG. 1 is a cross-sectional metallograph illustrating the fully densified microstructure of the sintered cladding and metallurgical bonding to the 4140 steel substrate.

Example 2

Figure 2:
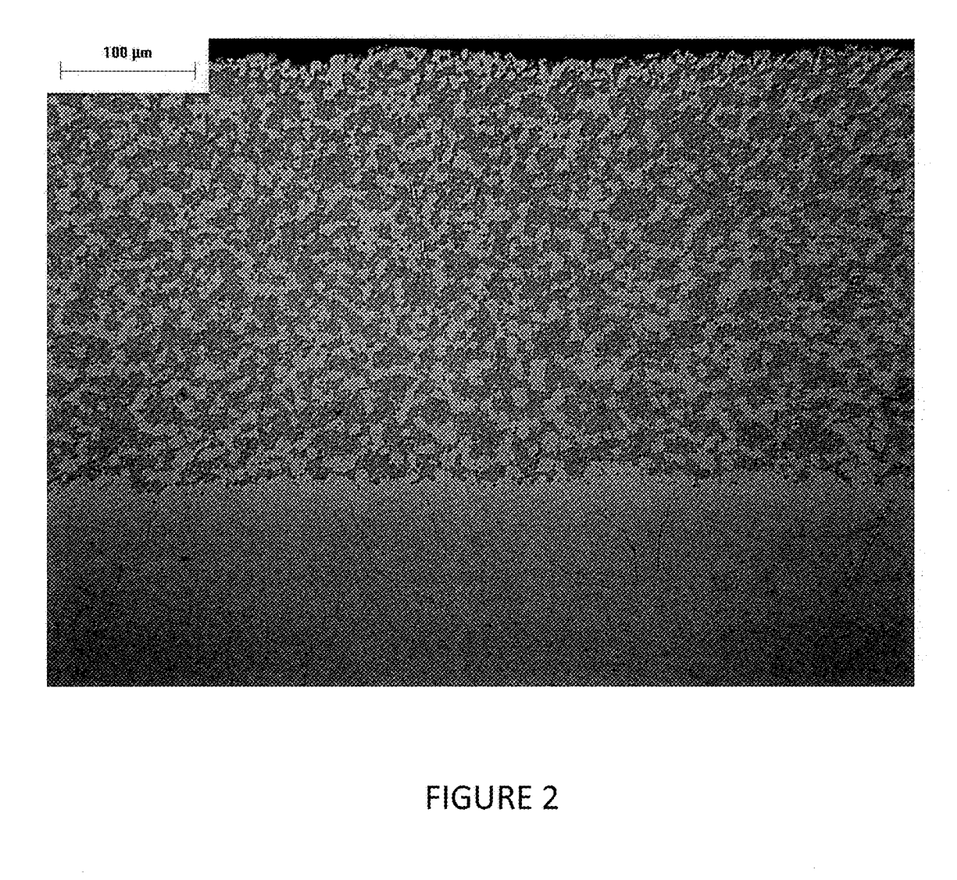
FIG. 2 is a cross-section metallograph of a cladded article according to one embodiment described herein.

A cladded article was produced according to a method described herein as follows. −270 mesh STELLITE® 720 alloy powder or alloy powder with a composition of 31-35 wt. % chromium, 16-20 wt. % molybdenum, 1-3 wt. % carbon, 0.15-0.45 wt. % boron, up to 1 wt. % manganese and up to 0.7 wt % silicon and the balance cobalt was blended with 6 vol. % PTFE and mechanically worked into a cloth-like flexible sheet. The cloth-like flexible sheet was applied to a 4140 steel substrate by adhesive, followed by debindering and heating in a vacuum furnace to a temperature of 1150-1200° C. and holding for 20 minutes to 2 hours to provide a fully dense sintered cladding metallurgically bonded to the 4140 steel substrate. The sintered cobalt-based alloy cladding had a composition of 30-35 wt. % chromium, 16-20 wt. % molybdenum, up to wt. % manganese, up to 0.7 wt. % silicon, 1-3 wt. % carbon, less than 0.3 wt. % boron and the balance cobalt. FIG. 2 is a cross-sectional metallograph illustrating the substantially fully densified microstructure of the sintered cladding and metallurgical bonding to the 4140 steel substrate.

Example 3

Figure 3:
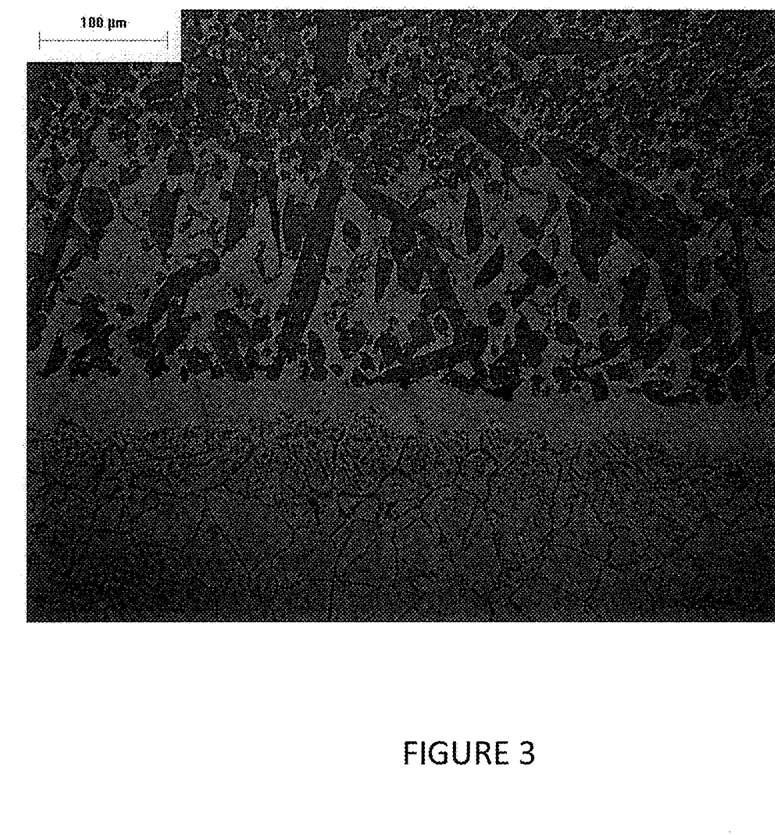
FIG. 3 is a cross-section metallograph of a cladded article according to one embodiment described herein.

A cladded article was produced according to a method described herein as follows. −270 mesh STELLITE® SF720 alloy powder or alloy powder with a composition of 31-35 wt. % chromium, 16-20 wt. % molybdenum, 1-3 wt. % carbon, 1.5-3.5% boron, up to 1% manganese and up to 0.7% silicon was blended with 6 vol. % PTFE and mechanically worked into a cloth-like flexible sheet. The cloth-like flexible sheet was applied to a 4140 steel substrate by adhesive, followed by debindering and heating in a vacuum furnace to a temperature of 1050-1120° C. and holding for 20 minutes to 2 hours to provide a fully dense sintered cladding metallurgically bonded to the 4140 steel substrate. The sintered cobalt-based alloy cladding had a composition of 30-35 wt. % chromium, 16-20 wt. % molybdenum, up to 1 wt. % manganese, up to 0.7 wt. % silicon, 1.0-3.0 wt. % carbon, 1.0-3.0 wt. % boron and the balance cobalt. FIG. 3 is a cross-sectional metallograph illustrating the substantially fully densified microstructure of the sintered cladding and metallurgical bonding to the 4140 steel substrate.

Example 4

Figure 4:
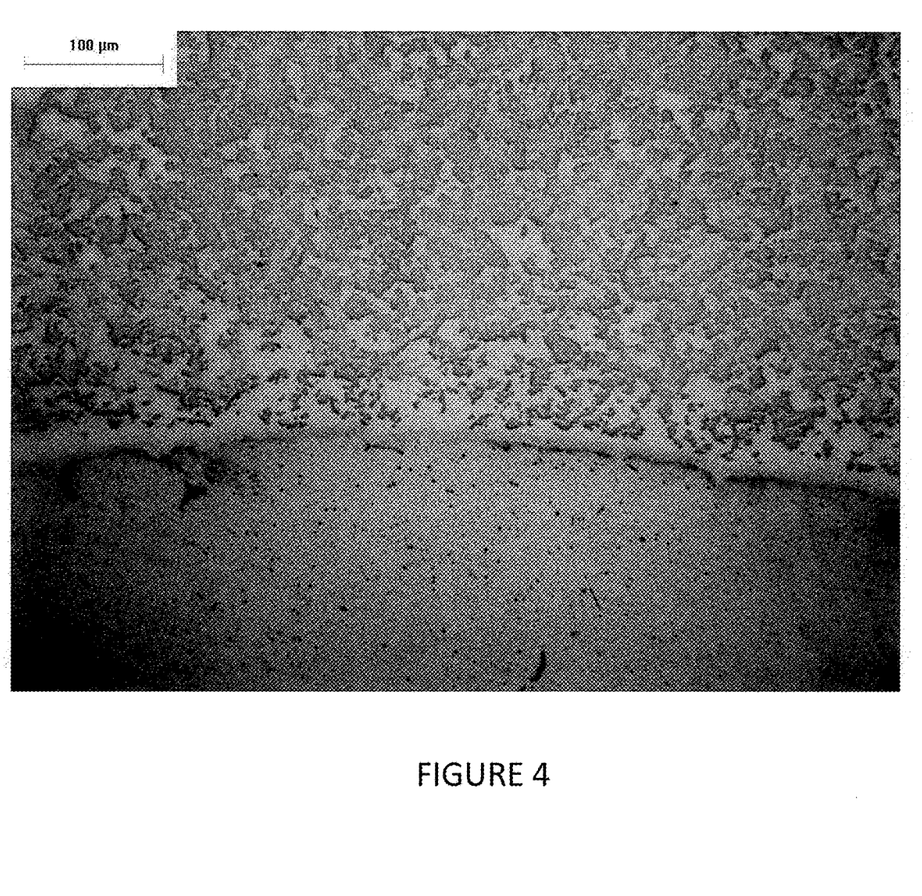
FIG. 4 is a cross-section metallograph of a cladded article according to one embodiment described herein.

A cladded article was produced according to a method described herein as follows. −270 mesh STELLITE® SF720 alloy powder or alloy powder with a composition of 31-35 wt. % chromium, 16-20 wt. % molybdenum, 1-3 wt. % carbon, 1.5-3.5% boron, up to 1% manganese, and up to 0.7% silicon was blended with 20 wt % WC powder of 2-5 microns and 6 vol. % PTFE and was mechanically worked into a cloth-like flexible sheet. The cloth-like flexible sheet was applied to a 4140 steel substrate by adhesive, followed by debindering and heating in a vacuum furnace to a temperature of 1050-1120° C. and holding for 20 minutes to 2 hours to provide a fully dense sintered carbide particle reinforced cobalt-based alloy composite cladding metallurgically bonded to the 4140 steel substrate. FIG. 4 is a cross-sectional metallograph illustrating the substantially fully densified microstructure of the sintered cladding and metallurgical bonding to the 4140 steel substrate.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

That which is claimed is:

1. A method of making a cladded article comprising:
disposing over a surface of a metallic substrate a sheet comprising organic binder and powder nickel-based alloy having a solidus temperature at least about 100° C. less than solidus temperature of the metallic substrate and;
heating the powder nickel-based alloy to provide a substantially fully dense sintered nickel-based alloy cladding metallurgically bonded to the metallic substrate, the sintered nickel-based alloy cladding comprising 8-25 wt. % chromium, 5-20% wt. % molybdenum, 0-6 wt. % tungsten, 0-5 wt. % total of niobium and tantalum, 0-4 wt. % cobalt, 0-30 wt. % iron, 0-1 wt. % manganese, 0.1-5 wt. % boron and the balance nickel.

2. The method of claim 1, wherein the solidus temperature of the powder nickel-based alloy is at least 150° C. less than the solidus temperature of the metallic substrate.

3. The method of claim 1, wherein the solidus temperature of the powder nickel-based alloy is at least 200° C. less than the solidus temperature of the metallic substrate.

4. The method of claim 1, wherein the powder nickel-based alloy further comprises an alloying additive of one or more elements of boron, phosphorus, silicon, aluminum or carbon in an amount sufficient to reduce the solidus temperature of the nickel-based powder alloy.

5. The method of claim 4, wherein the powder nickel-based alloy is heated to a temperature 200° C. to 400° C. below the solidus temperature of the metallic substrate.

6. The method of claim 1, wherein the metallic substrate is steel, iron-based alloy or nickel based alloy.

7. The method of claim 1, wherein an interfacial diffusion region having a thickness of 10-200 μm is established between the sintered nickel-based alloy cladding and the metallic substrate.

8. The method of claim 1, wherein the organic binder comprises one or more polymeric materials.

9. The method of claim 1, wherein the sheet further comprises hard particles providing substantially fully dense sintered nickel-based alloy composite cladding.

10. The method of claim 9, wherein the hard particles comprise one or more metal carbides, metal nitrides, metal borides, metal silicides, cemented carbides, cast carbides or mixtures thereof.

11. The method of claim 9, wherein the hard particles comprise one or more cemented carbides, cast carbides or mixtures thereof.

12. A method of making a cladded article comprising:
disposing over a surface of the metallic substrate a sheet comprising organic binder and powder nickel-based alloy having a solidus temperature at least 100° C. less than solidus temperature of the metallic substrate; and
heating the powder nickel-based alloy to provide a sintered nickel-based alloy cladding metallurgically bonded to the metallic substrate, wherein sintered nickel-based alloy cladding is of composition 17-22 wt. % chromium, 6-9 wt. % molybdenum, 0-5 wt. % iron, 2-4.2 wt. % total of niobium and tantalum, 0.01-5 wt. % boron and the balance nickel.

13. The method of claim 12, wherein the sintered nickel-based alloy cladding is substantially fully dense.

14. The method of claim 12, wherein the metallic substrate is steel, iron-based alloy or nickel-based alloy.

15. The method of claim 12, wherein the sheet further comprises hard particles providing sintered nickel-based alloy matrix composite cladding.

16. A method of making a cladded article comprising:
   disposing over a surface of a metallic substrate a sheet comprising organic binder and powder nickel-based alloy having a solidus temperature at least about 100° C. less than solidus temperature of the metallic substrate and;
   heating the powder nickel-based alloy to provide a substantially fully dense sintered nickel-based alloy cladding metallurgically bonded to the metallic substrate, the sintered nickel-based alloy cladding comprising 12-20 wt. % chromium, 5-11 wt. % iron, 0.5-2 wt. % manganese 0-2 wt. % silicon, 0-1 wt. % copper, 0-2 wt. % carbon, 0.1-5 wt. % boron and the balance nickel.

* * * * *